(12) United States Patent
Fekete et al.

(10) Patent No.: US 12,442,801 B2
(45) Date of Patent: Oct. 14, 2025

(54) DUAL STATIONARY PHASE GRADIENT COLUMNS FOR NEW SELECTIVITIES IN LIQUID CHROMATOGRAPHY

(71) Applicant: Waters Technologies Corporation, Milford, MA (US)

(72) Inventors: Szabolcs Fekete, Ville la Grand (FR); Matthew A. Lauber, North Smithfield, RI (US)

(73) Assignee: Waters Technologies Corporation, Milford, MA (US)

( * ) Notice: Subject to any disclaimer, the term of this patent is extended or adjusted under 35 U.S.C. 154(b) by 343 days.

(21) Appl. No.: 18/196,575

(22) Filed: May 12, 2023

(65) Prior Publication Data

US 2023/0366860 A1 Nov. 16, 2023

Related U.S. Application Data

(60) Provisional application No. 63/342,296, filed on May 16, 2022.

(51) Int. Cl.

| | |
|---|---|
| *G01N 30/56* | (2006.01) |
| *B01D 15/16* | (2006.01) |
| *B01D 15/38* | (2006.01) |
| *G01N 30/52* | (2006.01) |
| *G01N 30/02* | (2006.01) |

(52) U.S. Cl.
CPC ........... *G01N 30/52* (2013.01); *B01D 15/166* (2013.01); *B01D 15/3847* (2013.01); *G01N 30/56* (2013.01); *G01N 2030/027* (2013.01); *G01N 2030/562* (2013.01)

(58) Field of Classification Search
CPC .. G01N 30/52; G01N 30/56; G01N 2030/027; G01N 2030/562; G01N 30/88; G01N 30/34; G01N 30/50; B01D 15/166; B01D 15/3847

See application file for complete search history.

(56) References Cited

U.S. PATENT DOCUMENTS

| | | | |
|---|---|---|---|
| 3,907,971 A * | 9/1975 | Bohm ................ | B01D 53/68 423/489 |
| 12,078,621 B2 * | 9/2024 | Gritti ................ | G01N 30/461 |

(Continued)

OTHER PUBLICATIONS

Cain et al. "Destructive stationary phase gradient for reversed-phase/hydrophilic interaction liquid chromatography." J. Chromatogr. A. 1570(2018): 82-90.

(Continued)

*Primary Examiner* — David J Bolduc
(74) *Attorney, Agent, or Firm* — WOMBLE BOND DICKINSON (US) LLP; Deborah M. Vernon; Ricardo Joseph

(57) ABSTRACT

The present disclosure is directed to liquid chromatography columns and methods utilizing a stationary phase sorbent having two or more gradient factors. Each of the two or more gradient factors varies in a progressive manner along a length of the stationary phase sorbent in a direction from an inlet to an outlet of the column (i.e., along a length of the column). As a result of including these new continuous stationary phase gradients, new selectivities allowing for separation and analysis of complex samples including large biomolecules is achievable.

20 Claims, 13 Drawing Sheets

(56) References Cited

U.S. PATENT DOCUMENTS

| | | | | |
|---|---|---|---|---|
| 2008/0053830 | A1* | 3/2008 | Tsonev | B03C 5/00 |
| | | | | 204/661 |
| 2009/0139934 | A1* | 6/2009 | Steinecker | G01N 30/32 |
| | | | | 210/656 |
| 2011/0024356 | A1* | 2/2011 | Ozbal | G01N 30/6091 |
| | | | | 522/160 |
| 2011/0152499 | A1* | 6/2011 | Winniford | B01D 15/166 |
| | | | | 528/502 R |
| 2012/0118805 | A1* | 5/2012 | Steinecker | B01D 15/206 |
| | | | | 427/235 |
| 2017/0328872 | A1* | 11/2017 | Gilar | G01N 30/52 |
| 2018/0238838 | A1* | 8/2018 | Fogwill | G01N 30/30 |
| 2020/0041467 | A1* | 2/2020 | Vorm | G01N 30/22 |
| 2020/0332028 | A1* | 10/2020 | Lauber | G01N 33/58 |
| 2023/0027592 | A1* | 1/2023 | Vincent | C12N 9/6424 |

OTHER PUBLICATIONS

Pohl. "Preparation of ion exchange columns with longitudinal stationary phase gradients." Heliyon. 7(2021): e06961.

\* cited by examiner

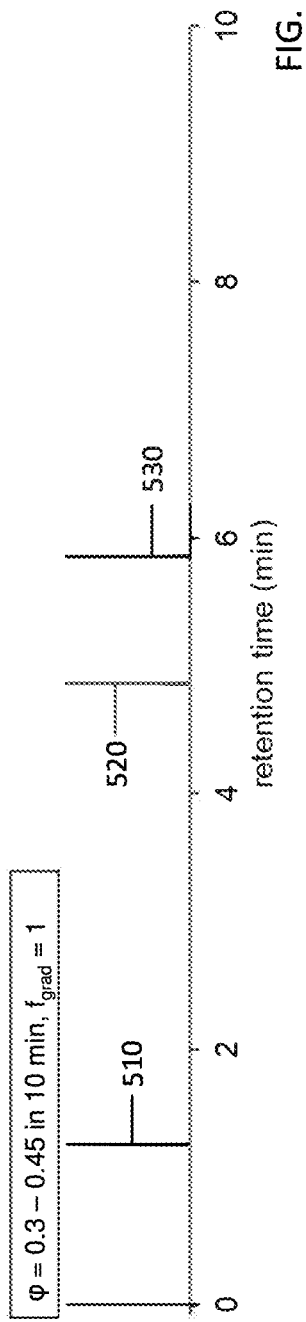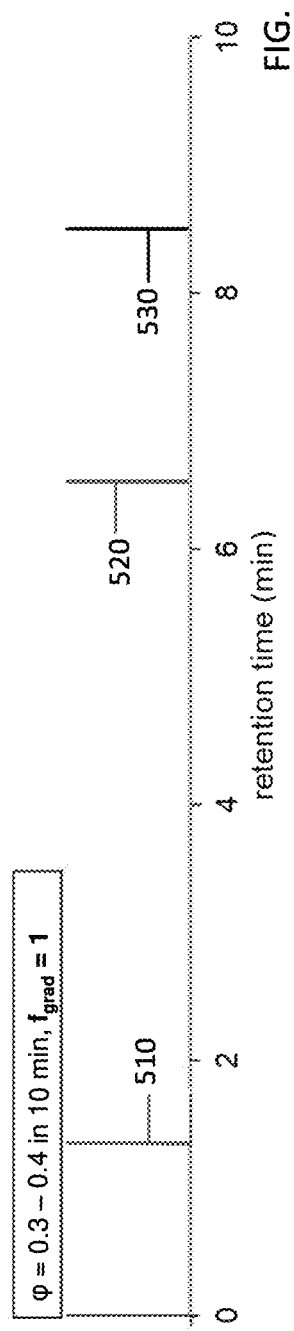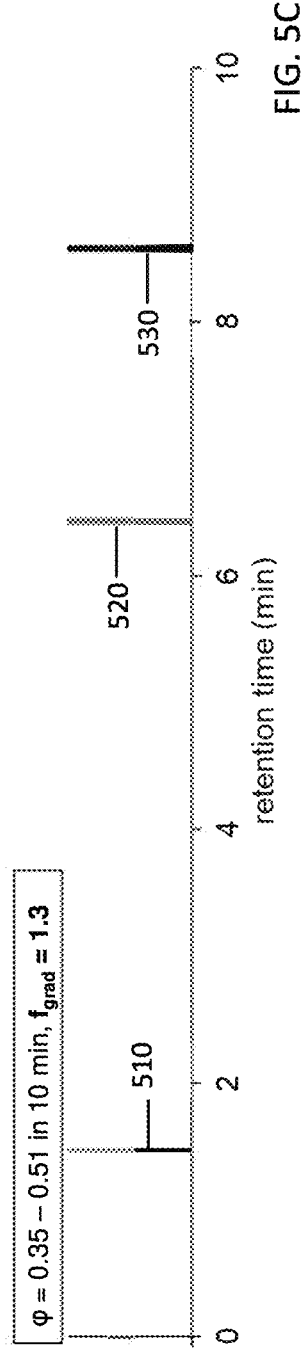

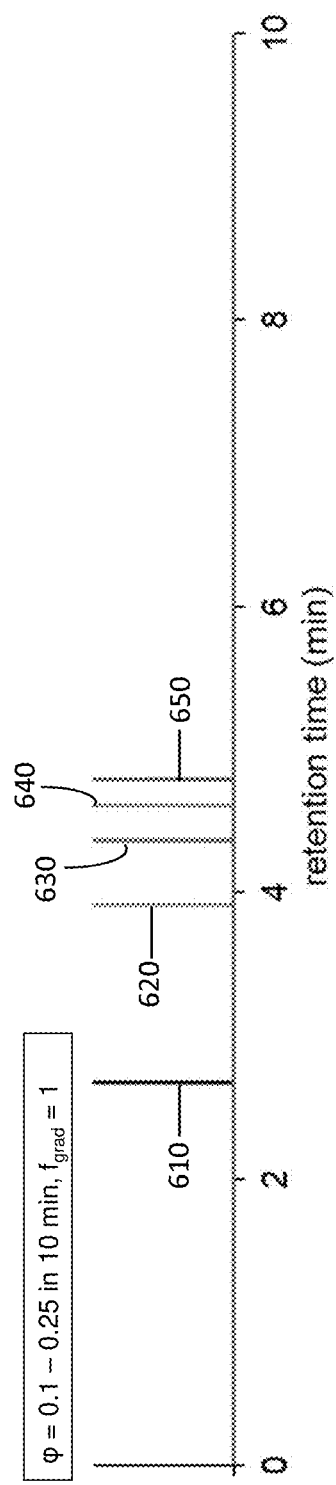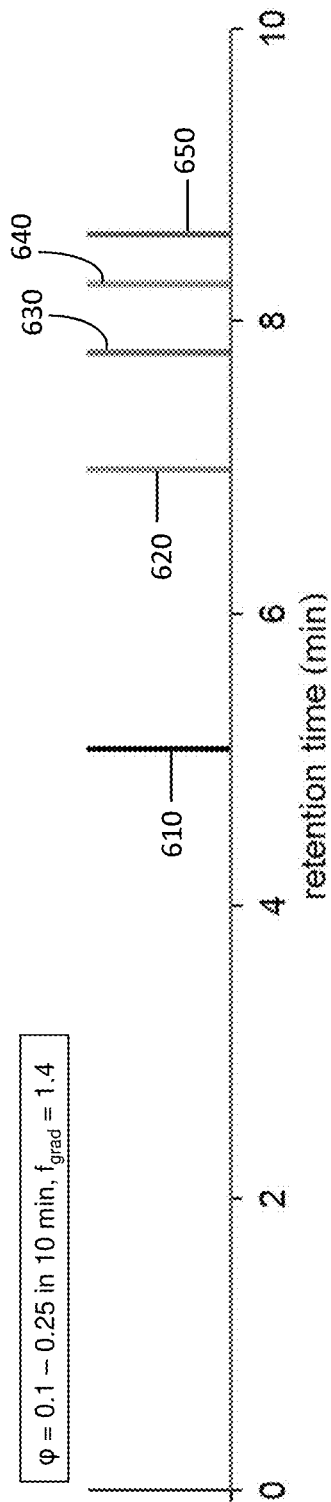
FIG. 6A
FIG. 6B

DUAL STATIONARY PHASE GRADIENT COLUMNS FOR NEW SELECTIVITIES IN LIQUID CHROMATOGRAPHY

CROSS-REFERENCE TO RELATED APPLICATIONS

This application claims priority to and the benefit of U.S. Provisional Application Ser. No. 63/342,296, filed May 16, 2022, and entitled "Dual Stationary Phase Gradient Columns for New Selectivities in Liquid Chromatography." The foregoing application is incorporated herein by reference in its entirety.

FIELD OF THE TECHNOLOGY

The present disclosure relates to the use of liquid chromatography columns having a stationary phase sorbent defined by at least two gradient factors and methods of using such columns to improve robustness of methods (e.g., broader mobile phase gradient available for separation) and/or to provide new selectivities in liquid chromatography that were heretofore unachievable.

BACKGROUND

Selectivity, the ability to differentiate components in a sample from each other, is an extremely important variable in liquid chromatography. This quality is especially important when analyzing complex samples including numerous components, which can overlap or interfere with identification. In liquid chromatographic analysis, selectivity generally arises from the selected stationary phase, which provides retention of analytes at different rates. While a mobile phase composition (and possible gradients) can encourage a greater or lesser degree of retention of analytes, the primary factor controlling selectivity is the ability of the stationary phase to differentially interact with each analyte in the sample.

Robustness of a liquid chromatographic method refers to how stable or suitable the method is throughout its implementation and in view of small parameter changes (e.g., environmental changes). Improvements to robustness improve the quality and dependability of an analysis and typically allow for greater implementation of parameter changes.

In efforts to advance robustness and increase selectivity in liquid chromatography, changes and variations to both stationary phase and mobile phase materials have been proposed. For example, discontinuous stationary phase gradients involving the coupling of different columns in series has been commercialized by Bischoff Chromatography. And mobile phase continuous gradients have been applied numerous types of liquid chromatography columns (e.g., mixed mode columns, ion exchange columns, etc.)

Continuous stationary phase gradients (i.e., a gradual change in chemical functionality along a length of a column) have not been commercially exploited and challenges have arisen in creating such continuous gradient along the length, especially when using a non-monolithic (e.g., particle based) stationary phase.

Few procedures have been published on the realization of continuous stationary phase gradients. Ionizable chains have been photografted onto a polymeric monolith for capillary electrochromatography. Gradient thin layer chromatography plates have been prepared using a controlled infusion of silanes. Controlled infusion has also been employed to create amine stationary phase gradients on silica monoliths.

Recently, a destructive methodology was proposed by Cain et al. from the Virginia Commonwealth University wherein trifluoroacetic acid (TFA) was infused onto a column to partially remove an alkyl bonding and thereby create stationary phase gradients on commercial C18 columns. The introduction of TFA while heating the column at 80° C. promoted acid hydrolysis of the alkylsilane ligand, and this effect can be made to dissipate across the bed of the column. And, Pohl in 2021 (Heliyon 7 (2021) e06961) proposed a method in which electrostatic attachment of anion exchange latex particles with charge density gradients could be used in ion-exchange chromatography.

While these new columns and methods illustrated a change in selectivity from columns having stationary phases lacking a gradient, the columns and methods failed to increase selectivity into new regimes, needed for separating large biomolecules in complex samples.

SUMMARY

In general, the present technology is directed to providing columns and methods using a stationary phase sorbent material having two or more continuous gradients along its length. The two or more gradients are designed to provide a unique manner of interaction between the stationary phase sorbent material and the analytes in the sample, thereby creating new, desirable selectivities. Methods and columns of the present technology can be used to increase robustness of separations, and further advantages can be realized when a solute forms multiple interactions with the stationary phase and interaction specific stationary phase gradients are developed. Without wishing to be bound by theory, it is believed that by providing a liquid chromatography column with the stationary phase material having two or more gradient factors, new selectivities which cannot be obtained by the modulation of mobile phase gradients alone can be achieved. Further improvements in robustness can be realized through the implementation of the columns together with mobile phase gradients.

In one aspect, the technology is directed to a liquid chromatographic column. The liquid chromatographic column includes a housing with an inlet and an outlet. A stationary phase sorbent is contained within the housing and extends from the inlet to the outlet. The stationary phase sorbent is defined by two or more gradients that vary in a progressive manner along a length of the stationary phase sorbent in a direction from the inlet to the outlet of the housing. Each gradient can be characterized by a gradient factor.

Embodiments of the above aspect include one or more of the following features. In some embodiments, at least one gradient of the two or more gradients increases along the length of the stationary phase sorbent in the direction from the inlet to the outlet (i.e., a gradient factor is greater than 1). In some embodiments, at least one gradient of the two or more gradients is relative to a first analyte interaction with the stationary phase sorbent. In certain embodiments, the two or more gradients are characterized by a first gradient factor and a second gradient factor, the second gradient factor having a different value than the first gradient factor. In some embodiments, the first gradient factor is relative to a first analyte interaction with the stationary phase sorbent and the second gradient factor is relative to a second analyte interaction with the stationary phase sorbent. In some instances, a first gradient associated with the first gradient factor increases (i.e. >1) along the length of the stationary phase sorbent and a second gradient associated with the second gradient factor also increases (i.e. >1) along the length of the stationary phase sorbent. In other instances, a first gradient associated with the first gradient factor increases (i.e. >1) along the length of the stationary phase sorbent, while a second gradient associated with the second gradient factor decreases (i.e. <1) along the length of the stationary phase sorbent. In some embodiments, the stationary phase sorbent is a mixed mode stationary phase comprising a first sorbent material and a second sorbent material. In some embodiments, the concentration of the first sorbent material varies in a progressive manner along the length of the stationary phase. In certain embodiments, the concentration of the second sorbent material varies in a progressive manner along the length of the stationary phase. In some instances, a rate of concentration variation of the first sorbent material is different than a rate of concentration variation of the second sorbent material. In certain instances, a rate of concentration variation of the first sorbent material is substantially the same as a rate of concentration variation of the second sorbent material. In some embodiments, the first sorbent material and the second sorbent material have chemically modified surfaces (e.g., surface bondings) with distinctly different surface coverages. In some instances, the first sorbent material has surface coverage of 1 µmol/m$^2$ C18 and 1 µmol/m$^2$ diethyl amino propyl bonding and the second sorbent material has surface coverage of 1.5 to 2 µmol/m$^2$ C18 and 0.5 to 0.1 µmol/m$^2$ diethyl amino propyl bonding. In some embodiments, the stationary phase sorbent comprises a material with a C18 alkyl surface coverage, wherein the C18 alkyl surface coverage varies progressively along the length of the column. In some embodiments, the stationary phase sorbent comprises a material with a charge modifier surface coverage, wherein the charge modifier surface coverage varies progressively along the length. In some embodiments, the stationary phase sorbent comprises an endcapped material, wherein endcapping coverage of the stationary phase sorbent varies progressively along the length.

In another aspect, the technology is directed to a method of improving a range of selectivity of a chromatographic separation. The method includes providing a chromatographic column including a stationary phase sorbent having two gradients that vary progressively along a length of the column; and applying a mobile phase gradient to separate a sample injected into the chromatographic column. That is, the method utilizes the two continuous gradients of the stationary phase together with a mobile phase gradient to separate the sample.

According to another aspect, the technology is directed to a method of modifying selectivity for a chromatographic separation. The method comprises controlling packing of a chromatographic column with a two-phase stationary phase sorbent. The two phase stationary phase sorbent comprising a first sorbent material and a second sorbent material, wherein the first sorbent material is disposed within the chromatographic column to provide a first gradient factor of greater than 1 or less than 1 (i.e., first gradient factor does not equal 1) from an inlet to an outlet and the second sorbent material is disposed within the chromatographic column to provide a second gradient factor of greater than 1 or less than 1 (i.e., second gradient factor does not equal 1) from the inlet to the outlet.

Embodiments of the above method can include one or more of the following features. In an embodiment, the first sorbent material is altered using in situ silanization to provide variation of the first gradient factor along a length of the column. In some embodiments, the first sorbent material is altered using in situ hydrolysis to provide variation of the first gradient factor. In certain embodiments, the first sorbet material is altered using desilanization (removal of silane bonds) to continuously alter the first sorbent material in a progressive manner along the length of the column.

BRIEF DESCRIPTION OF THE DRAWINGS

The technology will be more fully understood from the following detailed description taken in conjunction with the accompanying drawings, in which:

FIG. 5A displays an elution time plot for a sample including intact mAb and heavy chain and light chain subunits as calculated using a numerical analysis assuming a mobile phase gradient of 0.3-0.45 in 10 minutes, and a uniform stationary phase column (i.e., $f_{SF}=1$);

FIG. 5B displays an elution time plot for a sample including intact mAb and heavy chain and light chain subunits as calculated using a numerical analysis assuming a mobile phase gradient of 0.3-0.4 in 10 minutes, and a uniform stationary phase column (i.e., $f_{SF}=1$);

FIG. 5C displays an elution time plot for a sample including intact mAb and heavy chain and light chain subunits as calculated using a numerical analysis assuming a mobile phase gradient of 0.35-0.51 in 10 minutes, and a column having stationary phase with a continuous gradient having a gradient factor of 1.3 (i.e., $f_{SF}=1.3$);

FIG. 6A displays an elution time plot for a sample including oligonucleotides (dT 20, dT 40, dt 60, dT 80, and dT 100) as calculated using a numerical analysis assuming a mobile phase gradient of 0.1-0.25 in 10 minutes, and a uniform stationary phase column (i.e., $f_{SF}=1$);

FIG. 6B displays an elution time plot for a sample including oligonucleotides (dT 20, dT 40, dt 60, dT 80, and dT 100) as calculated using a numerical analysis assuming a mobile phase gradient of 0.1-0.25 in 10 minutes, and a column having stationary phase with a continuous gradient having a gradient factor of 1.4 (i.e., $f_{SF}=1.4$);

DETAILED DESCRIPTION

In general, the present disclosure is directed to stationary phase sorbent material having two or more continuous gradients along a length of a liquid chromatography column. The present disclosure is also related to the use of a stationary phase sorbent material having two or more continuous gradients along a length of a liquid chromatography column to increase the range of available selectivities for a separation. The stationary phase gradients are continuous. That is, the stationary phase retention to an analyte (e.g., analyte A) increases or decreases progressively through the length of the column from the inlet to the outlet. The stationary phase in the present technology is unique in that it provides at least two continuous retention gradients along its length (i.e., retention gradient of analyte A and of analyte B changes progressively along the length of the column). For example, the first gradient can be characterized as having a first gradient factor, $F_{SF1}$. A stationary phase gradient factor of >1 indicates an increasing retention to an analyte from the inlet to the outlet. A stationary phase gradient factor of <1 indicates a decreasing retention to an analyte from the inlet to the outlet.

Figure 1:
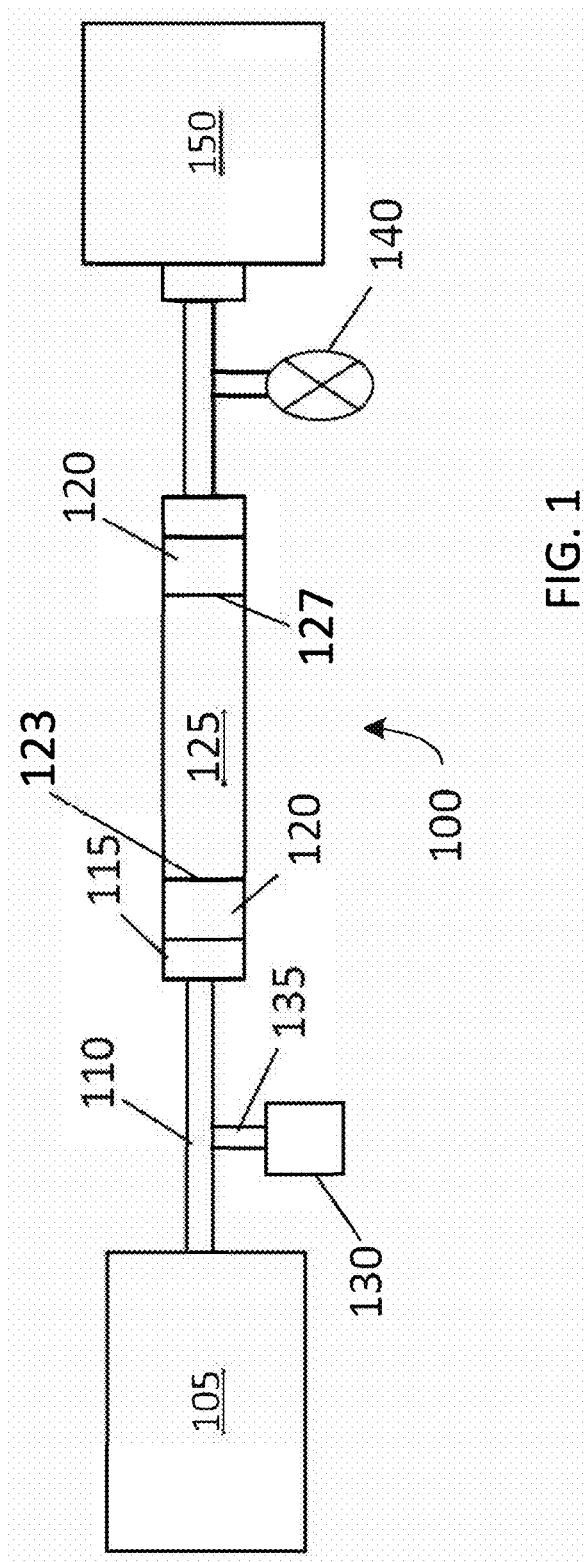
FIG. 1 is a schematic diagram of a typical chromatography system.

FIG. 1 is a representative schematic of a typical chromatography system 100 that can be used to separate samples, such as biomolecules. Chromatographic flow system 100 includes several components including a fluid manager system 105 (e.g., controls mobile phase flow through the system), tubing 110 (which could also be replaced or used together with micro fabricated fluid conduits), fluid connectors 115 (e.g., fluidic caps), frits 120, a chromatographic column 125, a sample injector 135 including a needle (not shown) to insert or inject the sample into the mobile phase, a vial, sinker, or sample reservoir 130 for holding the sample prior to injection, and a detector 150, such as a mass spectrometer. Chromatographic column 125 houses a stationary phase sorbent that extends from an inlet 123 to an outlet 127. The stationary phase is used to retain one or more analytes such that a sample can be separated.

The stationary phase sorbent housed within the column 125 is defined by two or more (e.g., 2, 3, etc.) gradient that vary in a progressive manner (e.g., continuously) lengthwise in a direction extending between the inlet 123 to the outlet 127. That is, each gradient (e.g., a first gradient, a second gradient, a third gradient, etc.) varies in a continuous fashion along the length of the column 125. Each gradient can vary in a distinct manner. For example, a first gradient can increase from inlet 123 to outlet 127, while the second gradient can decrease from inlet 123 to outlet 127. In other embodiments, the first gradient and second gradient can both increase from inlet 123 to outlet 127, but at different rates. Without wishing to be bound by theory, it is believed that a modulation of two unique interaction mechanisms across a chromatographic column opens up previously unseen selectivities for separations. The columns and methods described herein can be extremely useful in separating and analyzing complex samples, especially those including biomolecules of various sizes.

Figure 2:
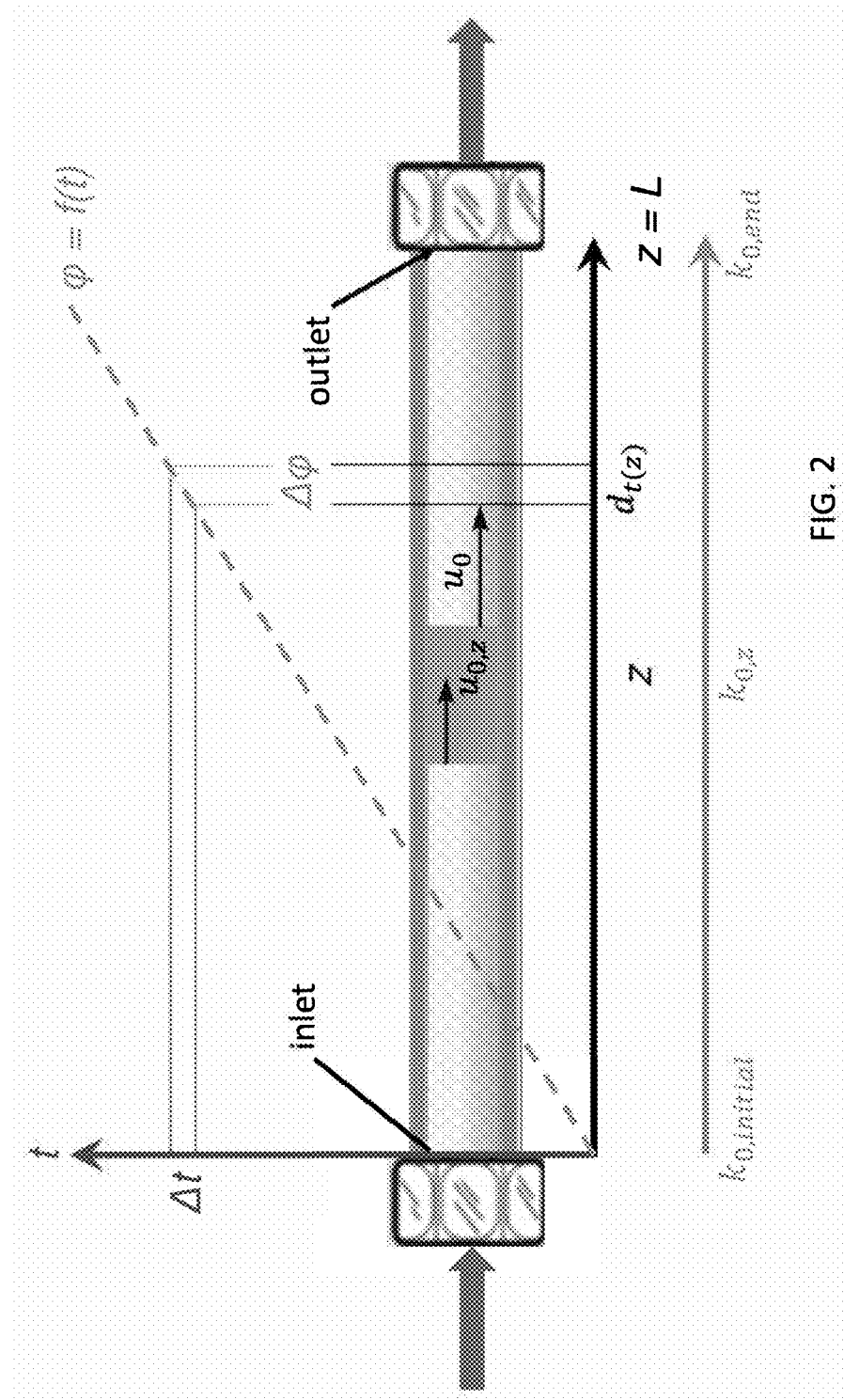
FIG. 2 is a schematic diagram of a chromatography column illustrating the parameters modeled in a numerical analysis.

To evaluate the effects of retention gradients on the stationary phase, a numerical analysis was conducted in which each of the gradients were associated with or characterized by a gradient factor. Using these gradient factors, an algorithm based on numerical integration to determine the migration speed (u) and the distance travelled by a solute (d) in both the temporal and spatial domains was applied. One can consider the mobile phase compositional gradient as a sequence of very small isocratic steps and similarly, the stationary phase gradient as very small uniform steps. Referring to FIG. 2, shown is an illustration of a column in which the numerical analysis was modeled after. For all model calculations, a linear solvent strength (LSS) model was applied for simplicity sake. This model has two parameters: log $k_0$ is the logarithm of solute retention in the weakest possible mobile phase and S which describes how sensitive solute retention is to mobile phase composition.

For a gradient stationary phase (a single gradient as an initial starting point), parameter S remained the same (as determined by the solute properties), while log $k_0$ changed along the column (e.g., the local retention factor continuously increases in case of positive stationary phase gradient). We introduced stationary phase gradient factor ($f_{SF}$) as:

$$f_{SF} = \frac{\log k_{0,out}}{\log k_{0,in}} \quad (1)$$

Where log $k_{0,out}$ and log $k_{0,in}$ are the logarithmic retention factors at column outlet and inlet, respectively. Then $f_{SF}=1$ corresponds to uniform column (no gradient), while >1 to positive gradient (i.e., an increasing gradient) and <1 to negative gradient (a decreasing gradient). In this analysis, the initial and final retention factors are defined with respect to a given column length (in analogy with the definition of selectivity as the ratio of retention factors).

Linear stationary phase and mobile phase gradients were assumed. For all model calculations we considered an L=10 cm long column, $u_0$=20 cm/min mobile phase velocity. Gradient time was set mostly as $t_G$=10 min, except when studying the impact of mobile phase gradient steepness ($t_G$ varied between 6 and 50 min). Plots of the distance travelled (d) by the solutes in time, plots of relative migration speed (urea, relative to mobile phase velocity) vs longitudinal migration distance (z) and contour plots of selectivity (a) vs $f_{SF}$ and/or mobile phase gradient steepness were constructed.

For LSS parameters, we used experimentally measured S values and log $k_0$ values (as inlet retention to model a gradient column, so log $k_0$=log $k_{0,in}$, then $f_{SF}$ determines log $k_{0,out}$) obtained on uniform column to simulate realistic cases. In this model, linearity refers to a continuous decrease/increase of the logarithmic retention factors. While other published references sometimes determine stationary phase gradient steepness as the change of retention factor and not as the logarithmic retention factors, as we have done, linear increments of stationary phase functionalities (e.g., concentration or surface coverage changes) will change retentivity in a logarithmic faction. As a result, in the model used in the present application it was more practical to use this linear form for the calculations. Thus, the $f_{SF}$ factor is a linear stationary phase gradient.

Various proteins (monoclonal antibody (mAb) intact and sub-units, ribonuclease, cytochrome c, BSA, myoglobin, enolase, insulin), oligonucleotides (dT 20, dT 40, dT 60, dT 80, dT 100) and some small molecules (ibuprofen and butylparaben) were considered for the model calculations. Results are provided below.

In the models, a mobile phase gradient was applied. The parameter phi ($\phi$), which represents the volume fraction of the stronger solvent in the mobile phase, given as a range indicates that a gradient was applied.

Selectivity for Large Solutes (Proteins, Oligonucleotides) on a Gradient

Figure 3B:
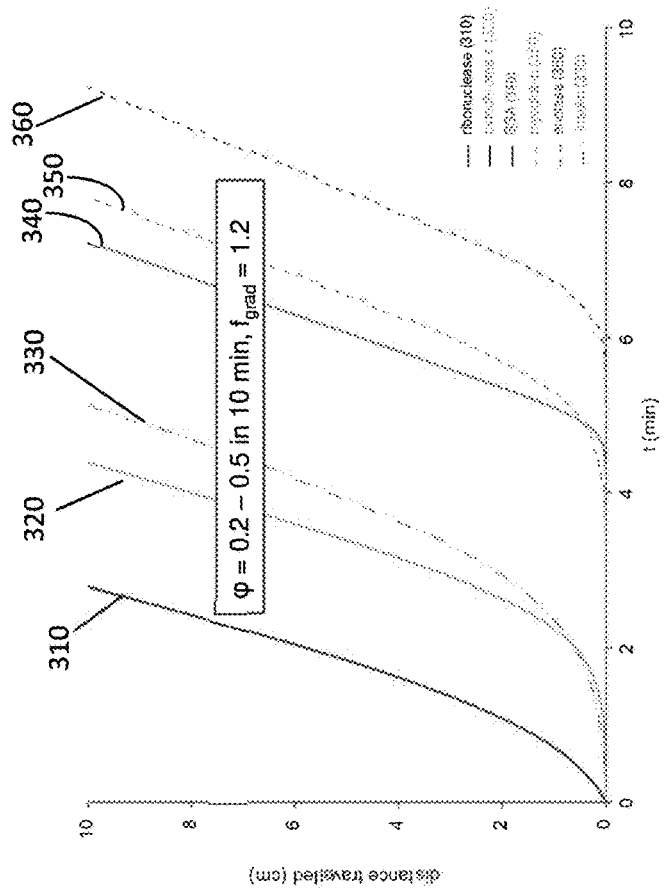
FIG. 3B illustrates a plot of distance travelled versus time for each of 5 different solutes in a protein mixture (ribonuclease, cytochrome c, BSA, myoglobin, enolase, and insulin) as calculated using a numerical analysis assuming a mobile phase gradient of 0.2-0.5 in 10 minutes, and a column having stationary phase with a continuous gradient having a gradient factor of 1.2 (i.e., $f_{SF}=1.2$)
Figure 3A:
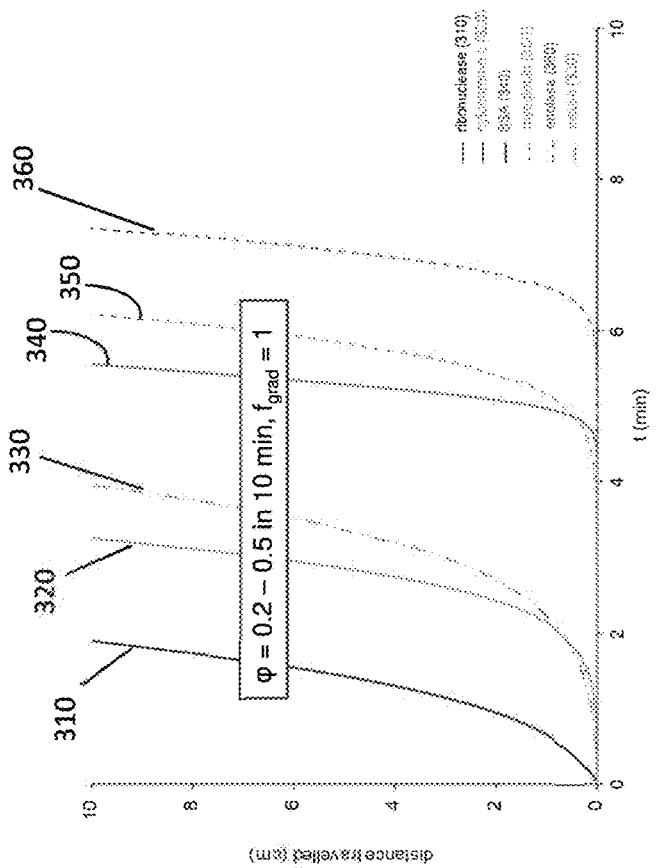
FIG. 3A illustrates a plot of distance travelled versus time for each of 5 different solutes in a protein mixture (ribonuclease (310), cytochrome c (320), BSA, (340) myoglobin (350), enolase (360), and insulin (330)) as calculated using a numerical analysis assuming a mobile phase gradient of 0.2-0.5 in 10 minutes, and a uniform stationary phase column (i.e., $f_{SF}=1$)
Figure 3D:
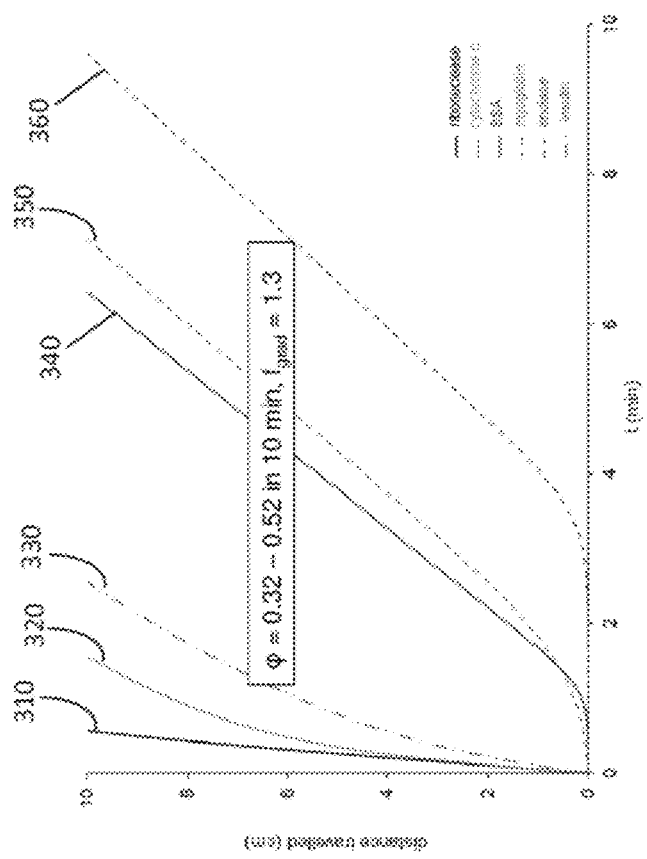
FIG. 3D illustrates a plot of distance travelled versus time for each of 5 different solutes in a protein mixture (ribonuclease, cytochrome c, BSA, myoglobin, enolase, and insulin) as calculated using a numerical analysis assuming a mobile phase gradient of 0.32-0.52 in 10 minutes, and a column having stationary phase with a continuous gradient having a gradient factor of 1.3 (i.e., $f_{SF}=1.3$)
Figure 3C:
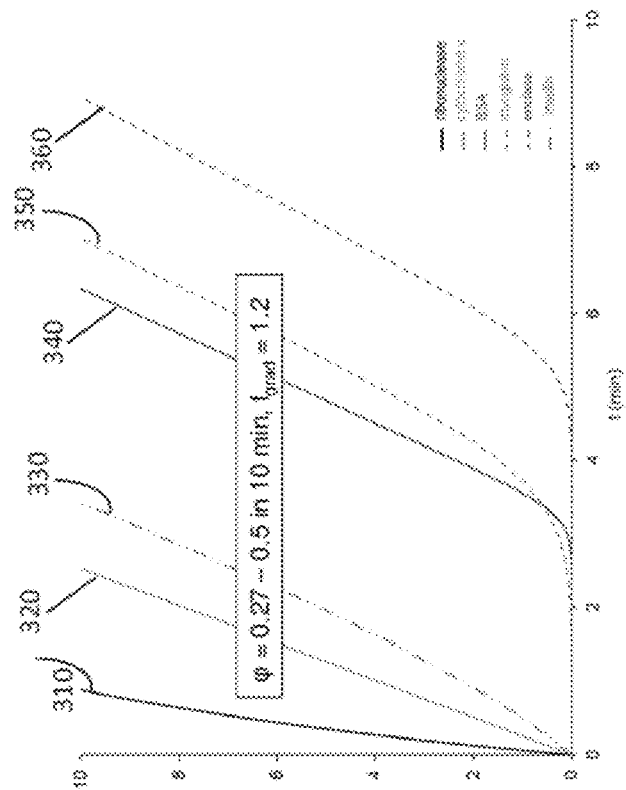
FIG. 3C illustrates a plot of distance travelled versus time for each of 5 different solutes in a protein mixture (ribonuclease, cytochrome c, BSA, myoglobin, enolase, and insulin) as calculated using a numerical analysis assuming a mobile phase gradient of 0.27-0.5 in 10 minutes, and a column having stationary phase with a continuous gradient having a gradient factor of 1.2 (i.e., $f_{SF}=1.2$)

Selectivity of a mixture containing ribonuclease (log $k_0$=7.2, S=28.9), cytochrome c (log $k_0$=10.9, S=38.3), BSA (log $k_0$=40.2, S=114.4), myoglobin (log $k_0$=15.2, S=40.4), enolase (log $k_0$=26.1, S=64.1) and insulin (log $k_0$=22.6, S=7.1) was studied on a set of gradient columns ($f_{SF}$=1, 1.2 and 1.3) operated with various mobile phase compositional gradients (0=0.20-0.50, 0.27-0.50, 0.32-0.52). For this example, as a starting analysis, just a single stationary phase gradient (i.e., a stationary phase characterized by a single gradient factor). FIG. 3A illustrates the results of no-stationary phase gradient ($f_{SF}$=1) and a mobile phase compositional gradient extending from 0.2 to 0.5 over ten minutes. FIG. 3B illustrates the results of a 1.2 (i.e., increasing) stationary phase gradient ($f_{SF}$=1.2) and a mobile phase compositional gradient extending from 0.2 to 0.5 over ten minutes. FIG. 3C illustrates the results of a 1.2 (i.e., increasing) stationary phase gradient ($f_{SF}$=1.2) and a mobile phase compositional gradient extending from 0.27 to 0.5 over ten minutes. FIG. 3D illustrates the results of a 1.3 (i.e., increasing) stationary phase gradient ($f_{SF}$=1.3) and a mobile phase compositional gradient extending from 0.32 to 0.52 over ten minutes. In each of FIGS. 3A-3D, results of the distance travelled versus time is provided for ribonuclease (line 310); for cytochrome c (line 320); for insulin (line 330); for BSA (line 340); for myoglobin (line 350) and for enolase (line 360).

A comparison of FIG. 3A to FIG. 3B compares the effect of including a stationary phase including a single positive retention gradient. That is, in both analyses shown in FIGS. 3A and 3B, the same mobile phase gradient was applied. By adding the stationary phase gradient, retention of the analytes increased, shifting each curve along the time scale to the right. A comparison of FIGS. 3B to 3C indicates the combined effects of increasing the mobile phase gradient together with a single stationary phase gradient. The plots shown in FIG. 3C are not only shifted to the left as compared to FIG. 3B, but also the slopes of the plots for ribonuclease, cyctochrome c, and insulin are affected. Further changes in slope for these three analytes are seen when both the mobile phase gradient and the stationary phase gradient are increased. Compare FIG. 3C to FIG. 3D.

Figure 4A:
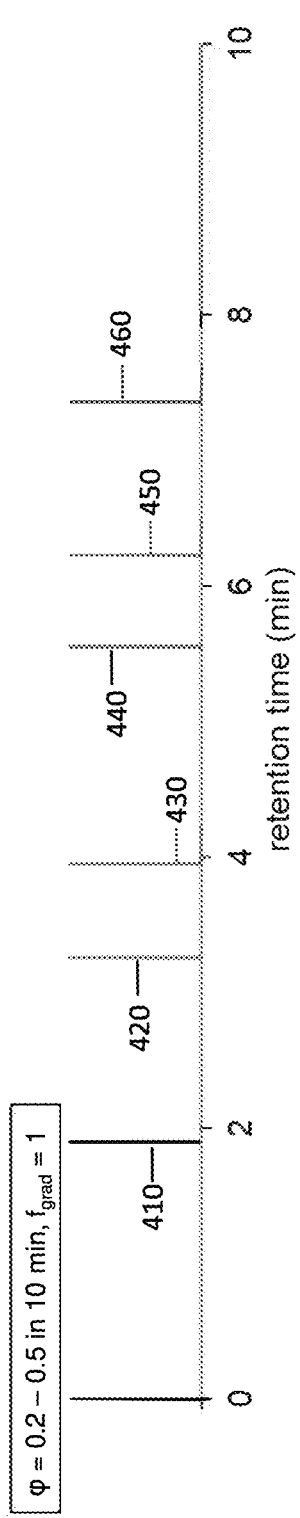
FIG. 4A displays an elution time plot for the 5 different solutes in the protein mixture under the conditions described for FIG. 3A.
Figure 4B:
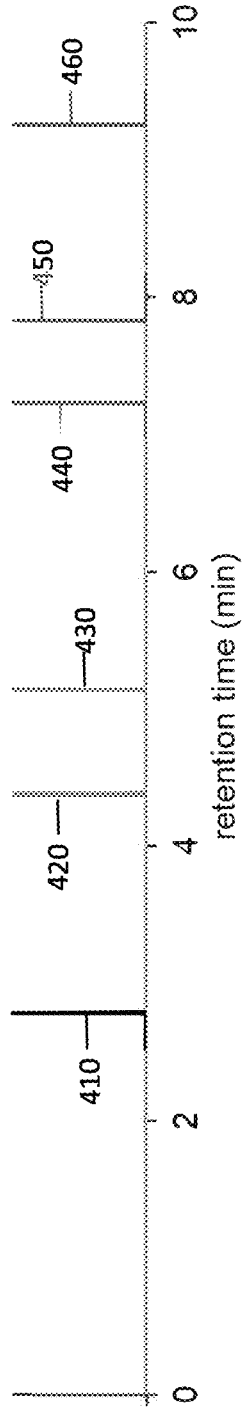
FIG. 4B displays an elution time plot for the 5 different solutes in the protein mixture under the conditions described for FIG. 3B.
Figure 4C:
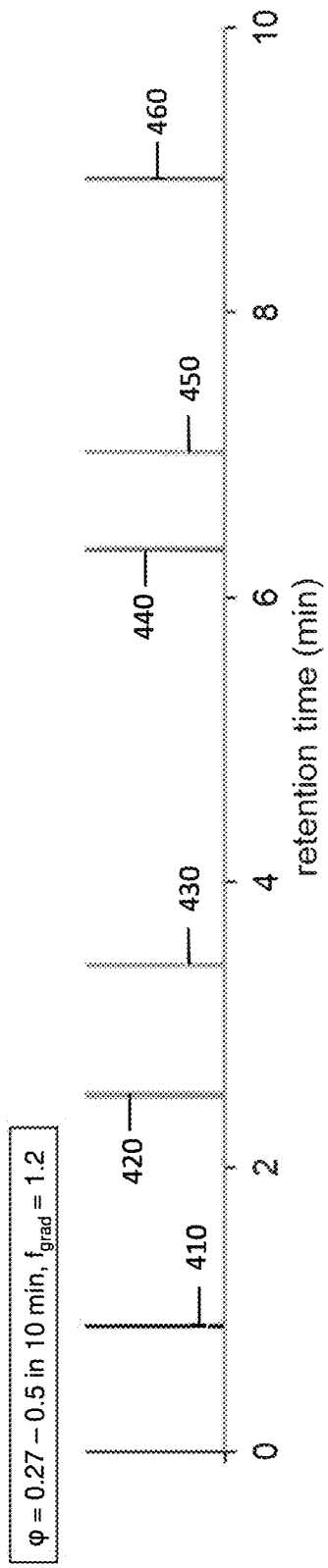
FIG. 4C displays an elution time plot for the 5 different solutes in the protein mixture under the conditions described for FIG. 3C.
Figure 4D:
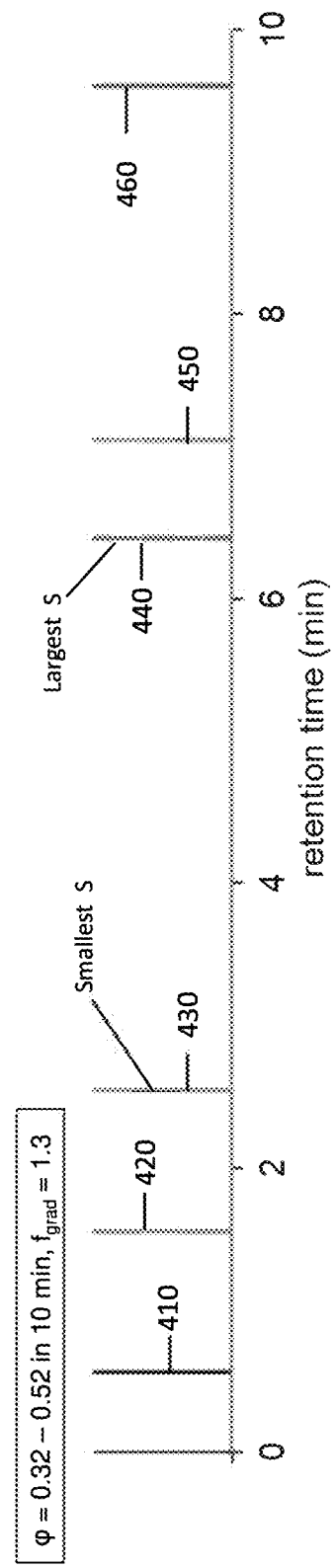
FIG. 4D displays an elution time plot for the 5 different solutes in the protein mixture under the conditions described for FIG. 3D.
Figure 6C:
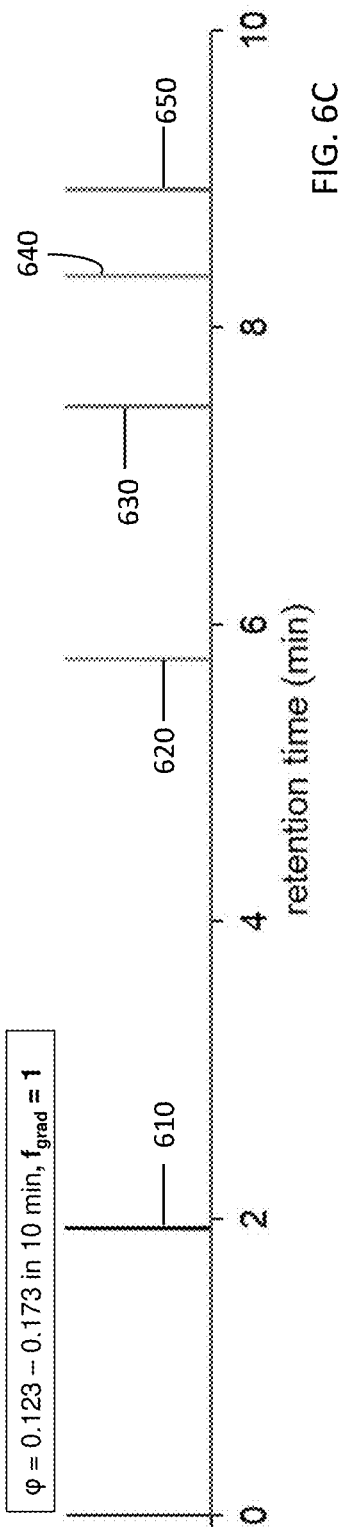
FIG. 6C displays an elution time plot for a sample including oligonucleotides (dT 20, dT 40, dt 60, dT 80, and dT 100) as calculated using a numerical analysis assuming a mobile phase gradient of 0.123-0.173 in 10 minutes, and a uniform stationary phase column (i.e., $f_{SF}=1$)
Figure 6D:
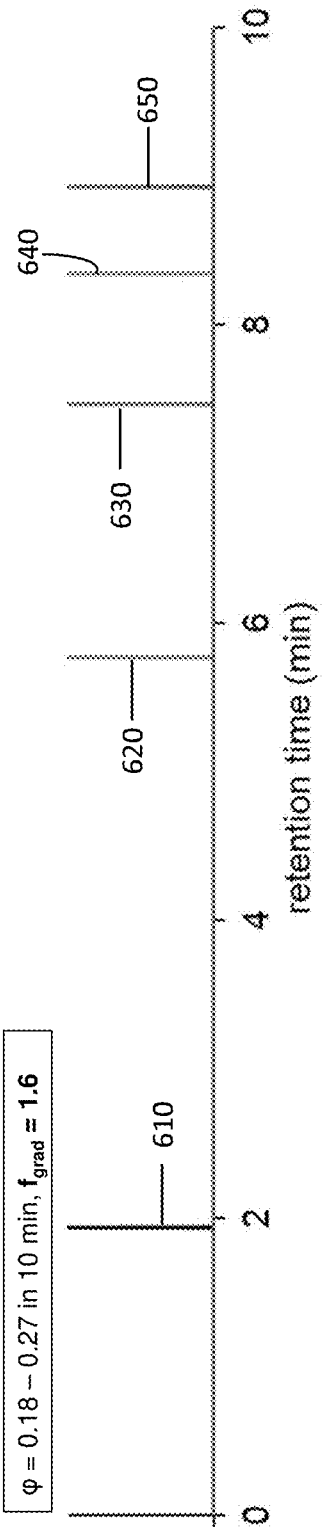
FIG. 6D displays an elution time plot for a sample including oligonucleotides (dT 20, dT 40, dt 60, dT 80, and dT 100) as calculated using a numerical analysis assuming a mobile phase gradient of 0.18-0.27 in 10 minutes, and a column having stationary phase with a continuous gradient having a gradient factor of 1.6 (i.e., $f_{SF}=1.6$)

When fixing the mobile phase gradient (i.e., the same mobile phase gradient), higher $f_{SF}$ factor results in higher selectivity. Compare distance between eluting analytes between FIGS. 4A and 4B. The largest improvement was seen for the selectivity between the largest (on-off like behavior, largest is BSA) and smallest (more regular elution behavior, smallest is insulin) protein molecules. However, when using a uniform column and changing the mobile phase compositional gradient (shifting to weaker eluent strength), a very similar selectivity could also be attained. See, for example FIG. 4C and FIG. 4D. In each of FIGS. 4A-4D, elution time results are provided for ribonuclease (line 410); for cytochrome c (line 420); for insulin (line 430); for BSA (line 440); for myoglobin (line 450) and for enolase (line 460).

A similar outcome was achieved for a mixture of intact mAb and its subunits (log $k_0$=6.0, S=18.8 for the light chain fragment and log $k_0$=10.5, S=27.6 for the heavy chain fragment) when assuming columns of $f_{SF}$=1-1.3. Nearly identical selectivity could be set with a fixed mobile phase gradient program on a gradient column as with a shifted and adjusted mobile phase gradient program on a uniform column. Compare FIGS. 5A, 5B, and 5C, in which lines 510 indicate the elution time of a first analyte, 520 indicate the elution time of a second analyte and lines 530 indicate the elution time of a third analyte.

Finally, a model for an oligonucleotide mixture (dT-20: log $k_0$=7.3, S=52.7, dT-40: log $k_0$=16.8, S=111.6, dT-60: log $k_0$=31.7, S=201.0, dT-80: log $k_0$=60.5, S=373.3 and dT-100: log $k_0$=143.6, S=868.5) eluted in ion-pairing reversed phase mode resulted in the same conclusion. A gradient column of $f_{SF}$=1.6 along with $\phi$=0.18-0.27 mobile phase gradient yielded the same selectivity as a uniform column, $F_{SF}$=1 with $\phi$=0.123-0.173. Compare FIG. 6A, FIG. 6B, FIG. 6C and FIG. 6D, in which lines 610 indicate the elution time of a first analyte—dT 20, 620 indicate the elution time of a second analyte—dT 40, lines 630 indicate the elution time of a third analyte—dT 60, lines 640 indicate the elution of a fourth analyte—dT 80, and lines 650 indicate the elution of a fifth analyte—dT 100).

Thus, even though a gradient column can significantly change selectivity on a fixed mobile phase gradient, it would not seem to provide any new form of selectivity versus a traditional uniform column used with an adjusted mobile phase gradient.

Dual Stationary Phase Gradients in Compositional Gradient Elution Mode

In reality, multiple interactions occur between any stationary phase and even the simplest of analyte. Moreover, mixed mode columns are designed to intentionally elicit two or more retention mechanisms.

In a second stage numerical analysis, the consequences of applying two distinct stationary phase gradients within a single column was evaluated. Two interaction mechanisms were envisioned (im-A and im-B) along with the use of mobile phase gradient. While in this example two different mechanism were envisioned related to two different solutes, one could apply this analysis to the same solute that adsorbs to different ligands of the stationary phase in different extents.

Figure 7B:
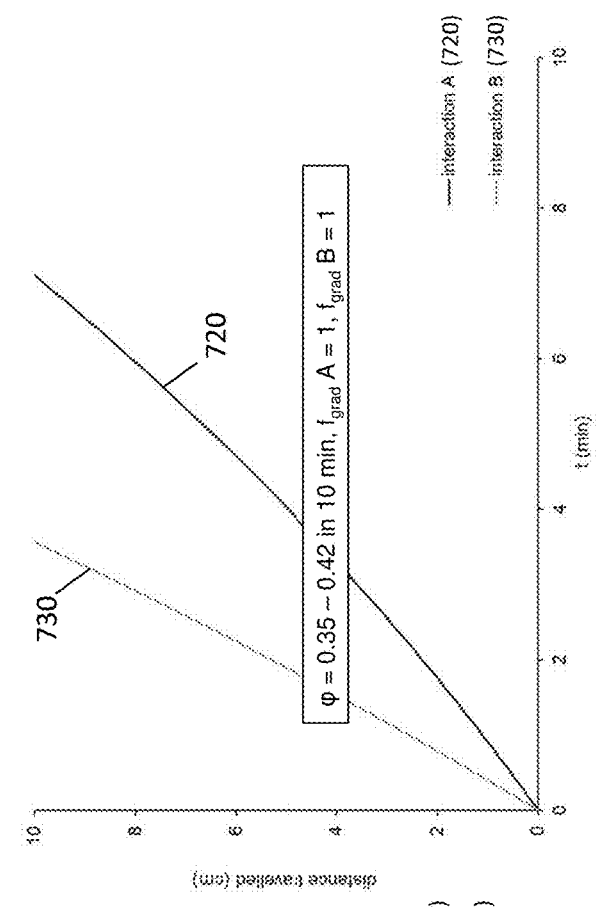
FIG. 7B illustrates a plot of distance travelled versus time for interaction A (stationary phase interaction with solute A) and for interaction B (stationary phase interaction with solute B) as calculated using a numerical analysis assuming a mobile phase gradient of 0.35-0.42 in 10 minutes, and a uniform stationary phase column for both A and B (i.e., $f_{SFA}=1$; $f_{SFB}=1$)
Figure 7A:
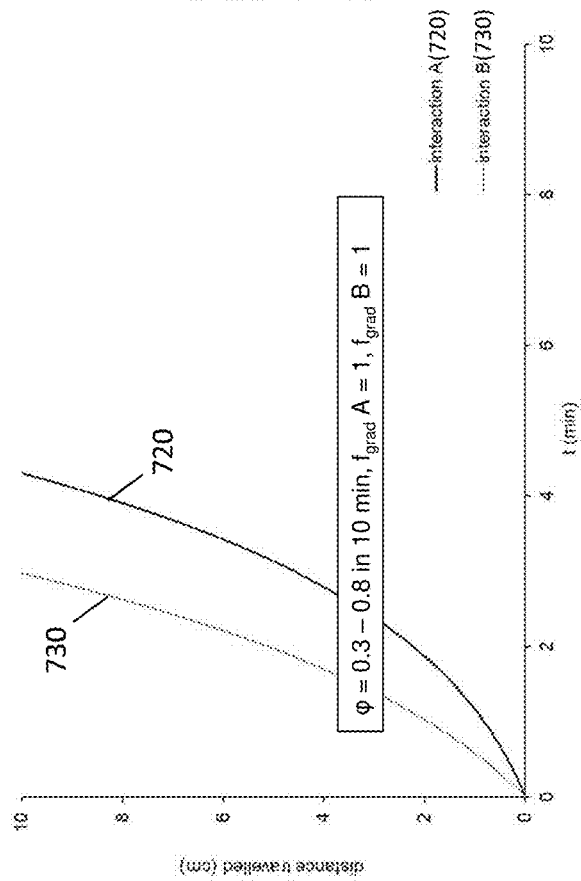
FIG. 7A illustrates a plot of distance travelled versus time for interaction A (stationary phase interaction with solute A) and for interaction B (stationary phase interaction with solute B) as calculated using a numerical analysis assuming a mobile phase gradient of 0.3-0.8 in 10 minutes, and a uniform stationary phase column for both A and B (i.e., $f_{SFA}=1$; $f_{SFB}=1$)
Figure 8B:
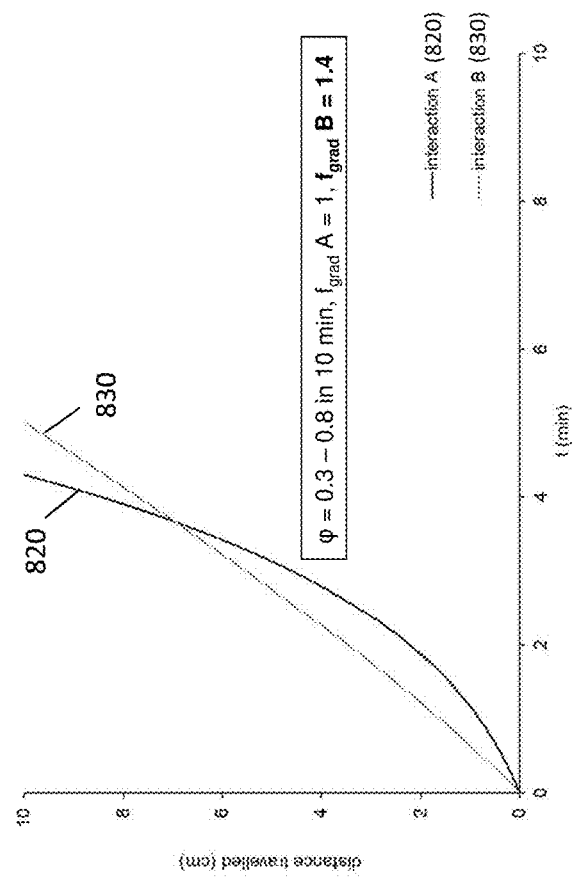
FIG. 8B illustrates a plot of distance travelled versus time for interaction A (stationary phase interaction with solute A) and for interaction B (stationary phase interaction with solute B) as calculated using a numerical analysis assuming a mobile phase gradient of 0.3-0.8 in 10 minutes, and a column having a uniform interaction with solute A (i.e., $f_{SFA}=1$) and a continuous increasing gradient with respect to solute B (i.e., $f_{SFB}=1.4$)
Figure 8A:
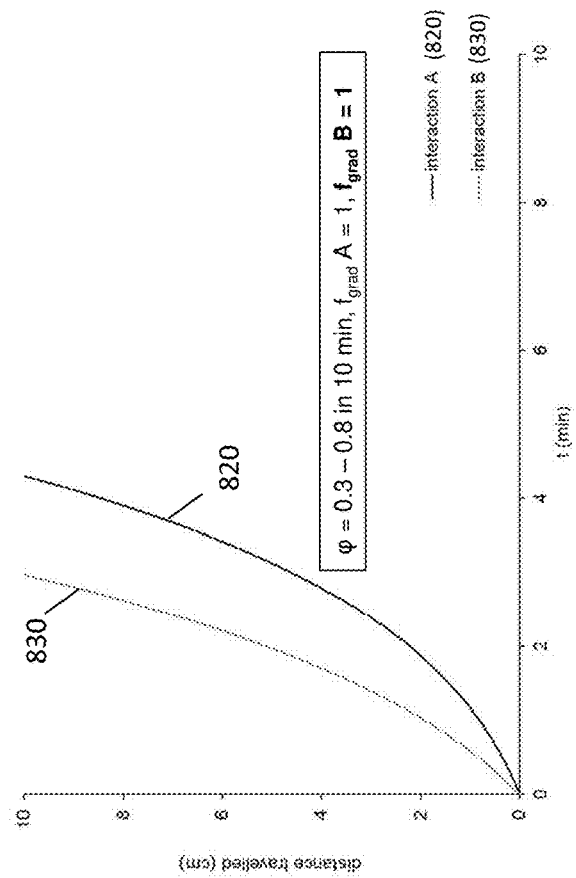
FIG. 8A illustrates a plot of distance travelled versus time for interaction A (stationary phase interaction with solute A) and for interaction B (stationary phase interaction with solute B) as calculated using a numerical analysis assuming a mobile phase gradient of 0.3-0.8 in 10 minutes, and a uniform stationary phase column for both A and B (i.e., $f_{SFA}=1$; $f_{SFB}=1$)

In a first scenario, analysis of two solutes being retained on a uniform column (i.e., no stationary phase gradient) by two different mechanisms (solute A elutes according to a change in im-A while solute B elutes according to a change in im-B) was evaluated. When these solutes were set to have the same S parameter value (S=5) for both interactions but slightly different log $k_0$ parameters (log $k_0$=3 for im-A and log $k_0$=2.6 for im-B), it was seen that that a fixed elution order would be obtained no matter the mobile phase gradient. In other words, an elution order change would not be possible through adjustments to the mobile phase gradient. See, FIG. 7A and FIG. 7B, in which line 720 illustrates the distance traveled versus time for interaction A, and line 730 illustrates the distance traveled versus time for interaction B. However, if a uniform interaction strength is assumed for one mechanism and a positive gradual change for the other, then the elution order can be changed. FIG. 8A shows the migration distance plots as a function of time for a uniform mixed mode mechanism ($f_{SF\_A}$=1, $f_{SF\_B}$=1). FIG. 8B shows the migration distance plots as a function of time for the combination of a uniform and gradient mixed mode mechanism ($f_{SF\_A}$=1, $f_{SF\_B}$=1.4) columns. In the numerical analysis used to generate both FIG. 8A and FIG. 8B, the same mobile phase concentration gradient was applied $\phi$=0.3-0.8 in 10 minutes. This analysis illustrates that the elution order for interaction A (line 820) can be altered as compared to interaction B (line 830). This result suggests that new selectivities can be achieved by the modulation of interaction mechanisms across a mixed mode column.

Figure 9:
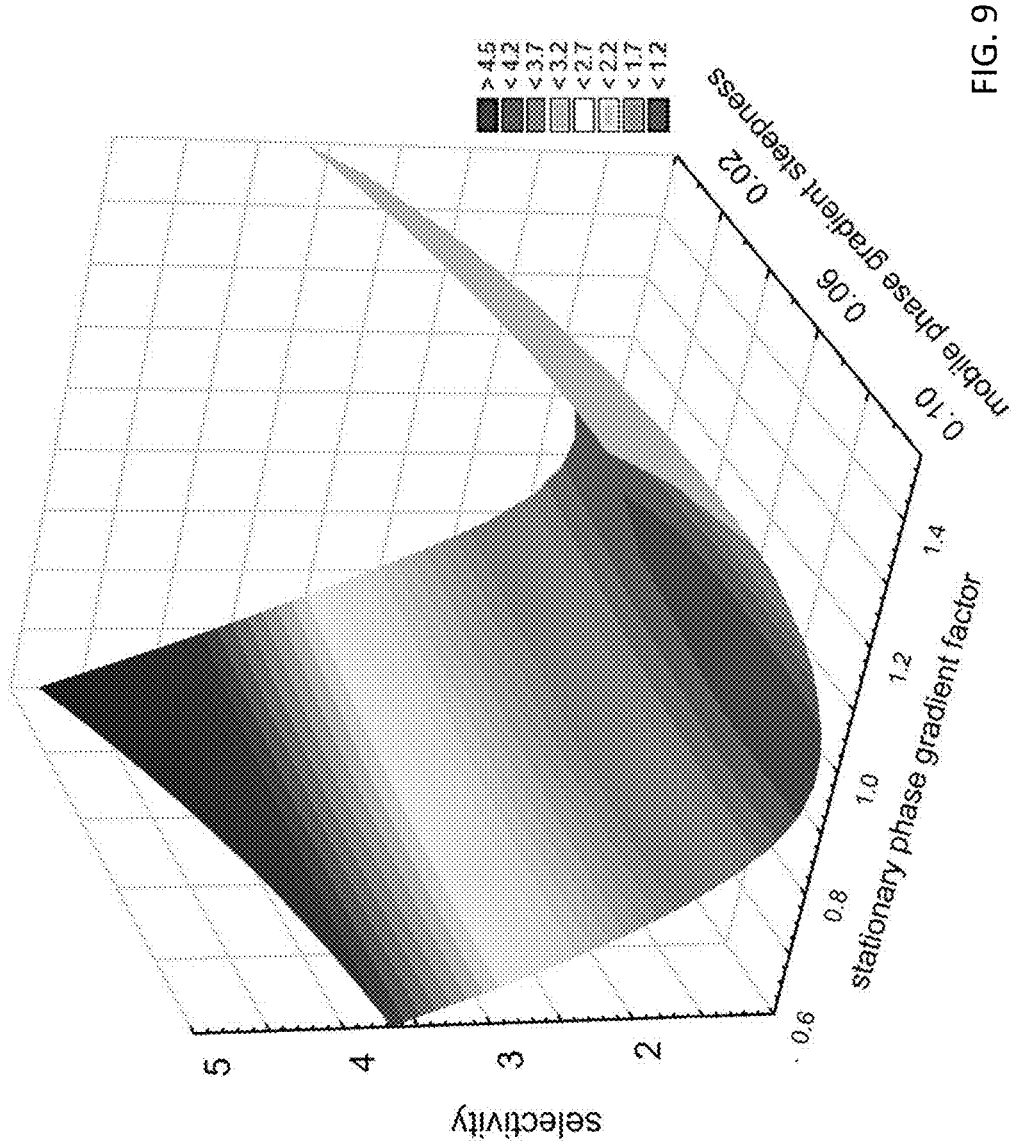
FIG. 9 displays a contour plot of selectivity for various stationary phase gradient factors versus mobile phase gradient steepness.

To further assess the effects of a stationary phase gradient on selectivity, a contour plot was constructed and presented in FIG. 9. This plot illustrates changes in selectivity as a function of mobile phase gradient steepness and stationary phase gradient steepness (fixed uniform phase for im-A and gradient phase for im-B). As can be seen, stationary phase gradient steepness has the higher impact on selectivity. The orientation of the stationary phase gradient (positive, $f_{SF\_B}$>1 or negative, $f_{SF\_B}$<1) determines the elution order of the compounds. Solute A elutes first in case of positive stationary phase gradient while the elution order is the opposite for negative stationary phase gradients.

Figure 10:
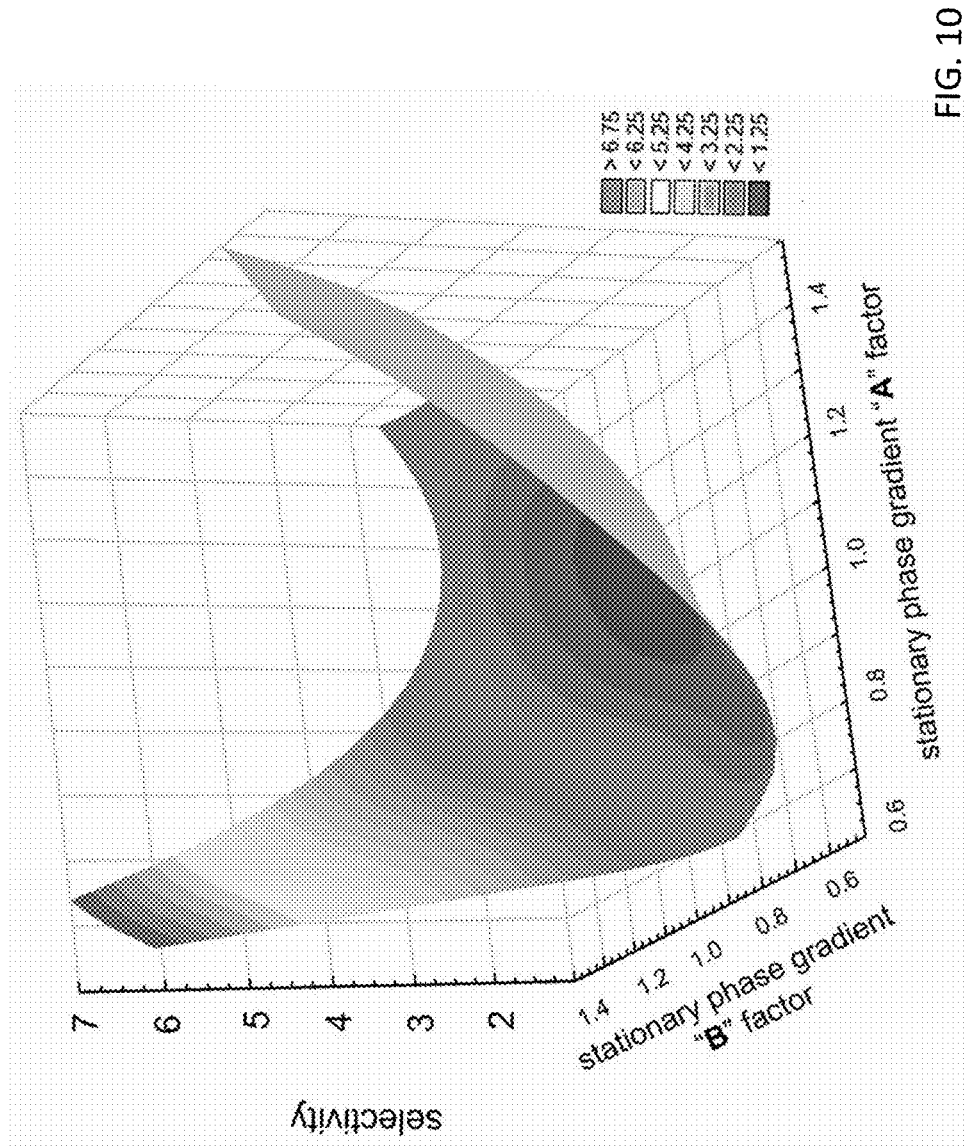
FIG. 10 displays a contour plot of selectivity for various combinations of stationary phase gradient A factors (i.e., a first gradient factor) and stationary phase gradient B factors (i.e., a second gradient factor).

A dual stationary phase gradient was also studied. The mobile phase compositional gradient program was fixed to $\phi$=0.3-0.8 in 10 min and various dual stationary phase gradients were investigated. FIG. 10 shows the corresponding selectivity plot, and it can be seen that both stationary phase gradients have huge effects on selectivity. As illustrated in FIG. 10, opposing dual gradients appear to be particularly effective. The highest selectivity can be reached when the direction of one stationary phase gradient is positive (>1) while the other is negative (<1). The lowest selectivity is obtained close to the diagonal of the plot, which corresponds to when there is commensurate change in the stationary phase composition for both interaction mechanisms (e.g., $f_{SFA}$~1.4 and $f_{SFB}$~1.4).

The above numerical analysis illustrated the unique selectivities provided by stationary phase materials of the present technology (which incorporate two or more gradients along a column's length). There are a number of ways to generate a stationary phase material that is defined by at least two analyte retention gradients along the length of a column—that is from an inlet to an outlet. The stationary phase sorbent of the present technology can be in particle form or in monolithic form. In some embodiments, the stationary phase material is formed from two different starting materials—that is, two different sorbent materials that are disposed along the column length provide a gradient. For example, in an embodiment in which the stationary phase is composed of sorbent A and sorbent B, gradients can be created by increasing or decreasing the concentration of sorbent A and of sorbent B along the length of the column. The rate of change in concentration for sorbent A and sorbent B can be different, opposite, and/or the same. For example, the concentration of sorbent A could increase from the inlet to the outlet at 1% in concentration per 1 mm for a 100 mm column; whereas the concentration of sorbent B could decrease from the inlet to the outlet at 1% in concentration per 1 mm. Alternatively, both sorbent A and sorbent B concentrations could increase along the length of the column at the same rate or at different rates.

Sorbent A and sorbent B can be entirely different materials; or alternatively, sorbent A and sorbent B can share a similar core material with different shell or surface modification materials surrounding the cores. For example, in an embodiment sorbent A is a C18 particle with an alkyl coverage that varies from 0 to 2.5 µmol/m$^2$ and sorbent B is a C18 with a diethyl amino propyl bondings that varies along the length of the column.

In addition to building the gradient into the column during loading or packing of the column, the gradient can be established through in situ techniques to alter the stationary phase along its length. In this way, the retention of an analyte with respect to the stationary phase can be altered in a progressive manner through the column.

In some embodiments, the first gradient of the stationary phase is built in (or positioned in) the column during loading or packing, while a second gradient of the stationary phase is created in situ by altering a material property of the packed/loaded stationary phase through infiltration of a chemical into either the inlet or the outlet. In some embodiments, more than one material property relating to retention of an analyte is altered through an in situ process. In certain embodiments, a first chemical affecting a first retention mechanism of the stationary phase is pushed through the inlet, while a second chemical affecting a second retention mechanism of the stationary phase is pushed through the outlet. In other embodiments, two different chemicals are pushed through the inlet, but at different times and/or at different rates. In situ processes may involve silanization of the packed/loaded stationary phase, hydrolysis of the packed/loaded stationary phase; and/or desilanization (i.e., destruction of silane bonding through an acid rip).

There are numerous different combinations of materials available for creating stationary phase sorbent materials in accordance with the present technology. The following examples are illustrative and are not intended to be limiting.

Altering Surface Modification to Create Gradients Along the Length of the Column In one embodiment, the surface chemistry of the particles in the chromatography column varies in terms of coverage from the inlet to the outlet of the column. In one specific embodiment, this could entail a C18 alkyl coverage that varies from 0 to 3 $\mu mol/m^2$ or conversely a 3 to 0 $\mu mol/m^2$. Along the same column, the surface coverage of a charge modifying, including but not limited to a bonding of 4-ethyl pyridine, 2 ethyl pyridine, diethylamino ethyl, diethylaminopropyl or bis dipropylethylamine silane, may vary from 1 to 0 $\mu mol/m^2$ or from 0 to 1 $\mu mol/m^2$. In yet other embodiments, it might be endcapping with triethyl, trimethyl silyl or hexamethyldisilazane.

Utilizing In Situ Silanization to Create Gradients Along the Length of the Column A column packed with 1.5 to 10 µm diameter porous, superficially porous or non-porous particles is plumbed onto a pump system. A solution of dissolved silane with a controlled concentration is then pumped through the inlet. Heating is applied to the column as needed to facilitate the bonding of the silane to the siloxyl surface. Flow rate and time is optimized for the surface coverage gradient/stationary phase gradient that is desired. Stop flow conditions might even be applied. The column is then flushed of the reagents and/or the reaction is quenched with a change to the solution conditions. Subsequently, in some embodiments in which two silanization reactions are desired, the column direction is inverted and a second silane solution is pumped into the column with the same reaction conditions mentioned above.

Using a Mixed Particle Slurry and Packing the Column with Concentration Gradients Two or more unique batches of stationary phase can be mixed it varying proportions and incrementally packed into a column body. In one specific embodiment, a stationary phase having coverages of 1 $\mu mol/m^2$ C18 and 1 $\mu mol/m^2$ diethyl amino propyl bonding will be mixed in varying proportions with a stationary phase having coverages of 1.5 $\mu mol/m^2$ C18 and 0.5 $\mu mol/m^2$ diethyl amino propyl bondings. Moreover, the latter stationary phase could be mixed with a stationary phase having surface coverages of 2 $\mu mol/m^2$ C18 and 0.1 $\mu mol/m^2$ diethyl amino propyl bondings. Prepared slurries varying in the proportionate amounts of these stationary phase would then be incrementally or sequentially packed into the column body.

What is claimed is:

1. A chromatographic column comprising:
a housing with an inlet and an outlet; and
a stationary phase sorbent contained within the housing and extending from the inlet to the outlet, wherein the stationary phase sorbent is defined by two or more retention gradients that vary in a progressive manner along a length of the stationary phase sorbent in a direction from the inlet to the outlet of the housing.

2. The chromatographic column of claim 1, wherein at least one gradient of the two or more gradients increases along the length of the stationary phase sorbent in the direction from the inlet to the outlet.

3. The chromatographic column of claim 1, wherein at least one gradient is relative to a first analyte interaction with the stationary phase sorbent.

4. The chromatographic column of claim 1, wherein the two or more gradients are characterized by a first gradient factor and a second gradient factor, the second gradient factor having a different value than the first gradient factor.

5. The chromatographic column of claim 4, wherein the first gradient factor is relative to a first analyte interaction with the stationary phase sorbent and the second gradient factor is relative to a second analyte interaction with the stationary phase sorbent.

6. The chromatographic column of claim 5, wherein the first gradient factor increases (>1) along the length of the stationary phase sorbent and wherein the second gradient factor increases (>1) along the length of the stationary phase sorbent.

7. The chromatographic column of claim 5, wherein the first gradient factor increases (>1) along the length of the stationary phase sorbent and wherein the second gradient factor decreases (<1) along the length of the stationary phase sorbent.

8. The chromatographic column of claim 1, wherein the stationary phase is a mixed mode stationary phase comprising a first sorbent material and a second sorbent material.

9. The chromatographic column of claim 8, wherein concentration of the first sorbent material varies in a progressive manner along the length of the stationary phase.

10. The chromatographic column of claim 9, wherein concentration of the second sorbent material varies in a progressive manner along the length of the stationary phase.

11. The chromatographic column of claim 10, wherein a rate of concentration variation of the first sorbent material is different that a rate of concentration variation of the second sorbent material.

12. The chromatographic column of claim 10, wherein a rate of concentration variation of the first sorbent material is substantially the same as a rate of concentration variation of the second sorbent material.

13. The chromatographic column of claim 8, wherein the first sorbent material and the second sorbent material have chemically modified surfaces with distinctly different surface coverages.

14. The chromatographic column of claim 13, wherein the first sorbent material has surface coverage of 1 $\mu mol/m^2$ C18 and 1 $\mu mol/m^2$ diethyl amino propyl bonding and the second sorbent material has surface coverage of 1.5 to 2 $\mu mol/m^2$ C18 and 0.5 to 0.1 $\mu mol/m^2$ diethyl amino propyl bonding.

15. The chromatographic column of claim 3, wherein the stationary phase sorbent comprises a material with a C18 alkyl surface coverage, wherein the C18 alkyl surface coverage varies progressively along the length.

16. The chromatographic column of claim 3, wherein the stationary phase sorbent comprises a material with a charge modifier surface coverage, wherein the charge modifier surface coverage varies progressively along the length.

17. The chromatographic column of claim 3, wherein the stationary phase sorbent comprises an endcapped material, wherein the endcapping coverage of the stationary phase sorbent varies progressively along the length.

18. A method of improving a range of selectivity of a chromatographic separation, the method including:
   providing a chromatographic column, wherein the column includes a stationary phase sorbent material having two gradients that vary progressively along a length of the column; and
   applying a mobile phase gradient to separate a sample injected into the chromatographic column.

19. A method of modifying selectively for a chromatographic separation, the method comprising:
   controlling packing of a chromatographic column with a two phase stationary phase sorbent, the two phase stationary phase sorbent comprising a first sorbent material and a second sorbent material, the first sorbent material differing from the second sorbent material, wherein the first sorbent material is disposed within the chromatographic column to provide a first gradient factor of greater than 1 from an inlet to an outlet and the second sorbent material is disposed within the chromatographic column to provide a second gradient factor of greater than 1 from an inlet to the outlet.

20. The method of claim 19, wherein the first sorbent material is altered using in situ silanization to provide variation of the at least one gradient factor along the length of the column.

* * * * *